United States Patent [19]

Nonn et al.

[11] 4,340,389
[45] Jul. 20, 1982

[54] PROCESS FOR THE PREPARATION OF WATER-SOLUBLE DYESTUFFS WITH A LOW SALT CONTENT

[75] Inventors: Konrad Nonn, Leverkusen; Joachim Laser, Cologne; Karlheinz Wolf, Leverkusen; Reinhold Hörnle, Cologne; Erich Istel, Dormagen, all of Fed. Rep. of Germany

[73] Assignee: Bayer Aktiengesellschaft, Leverkusen, Fed. Rep. of Germany

[21] Appl. No.: 254,365

[22] Filed: Apr. 15, 1981

[30] Foreign Application Priority Data

May 3, 1980 [DE] Fed. Rep. of Germany ....... 3017070

[51] Int. Cl.$^3$ ............................................. C09B 67/54
[52] U.S. Cl. .......................................... 8/620; 8/524; 260/208
[58] Field of Search .................... 8/620, 524; 260/208

[56] References Cited

U.S. PATENT DOCUMENTS

| | | | |
|---|---|---|---|
| 1,889,491 | 11/1932 | Philippe | 8/620 |
| 2,590,847 | 4/1952 | Dalton et al. | 8/620 |
| 2,814,614 | 11/1957 | Zickendraht | 260/208 |
| 3,770,371 | 11/1973 | Bossard et al. | 8/620 |
| 4,263,197 | 4/1981 | Lienhard | 8/516 |

FOREIGN PATENT DOCUMENTS 331 1/1979 European Pat. Off.

*Primary Examiner*—A. Lionel Clingman
*Attorney, Agent, or Firm*—Sprung, Horn, Kramer & Woods

[57] ABSTRACT

Process for the preparation of water-soluble dyestuffs with a low salt content, characterized in that the water-soluble dyestuffs are salted out from their aqueous solutions and/or dispersions by adding salts which are volatile at temperatures of about 40° C. to about 250° C. under a pressure of about 10 mm Hg to about 760 mm Hg, the dyestuffs are isolated and the volatile salts are volatilized during the drying process.

7 Claims, No Drawings

PROCESS FOR THE PREPARATION OF WATER-SOLUBLE DYESTUFFS WITH A LOW SALT CONTENT

The invention relates to a process for the preparation of water-soluble dyestuffs with a low salt content, which is characterised in that the water-soluble dyestuffs are salted out from their aqueous solutions and/or dispersions by adding salts which are volatile at temperatures of about 40° C. to about 250° C. and under a pressure of about 10 mm Hg to about 760 mm Hg, the dyestuffs are isolated and the volatile salts are volatilised during the drying process.

Compared with the conventional processes, with which the dyestuffs are salted out with non-volatile salts such as NaCl, $Na_2SO_4$ and the like, the process according to the invention gives dyestuffs which are virtually salt-free and which have considerably better solubility in water and/or organic media than do the salt-containing dyestuffs.

Suitable water-soluble dyestuffs are anionic and cationic dyestuffs which have their absorption maximum in the visible and ultraviolet range of the spectrum.

Anionic dyestuffs which can be used are, for example, dyestuffs which contain, as the group conferring solubility in water, the COOH group, but preferably the $SO_3H$ group or salts thereof, such as, for example, phthalocyanine, nitro-, di- or tri-arylmethane, oxazine, thiazine, dioxazine, xanthene, anthraquinone and azo dyestuffs, and also sulpho group-containing and sulpho group-free 1:1-metal complex dyestuffs or in particular 1:2-metal complex dyestuffs, such as 1:1-nickel complexes, 1:1-cobalt complexes, 1:1-copper complexes, 1:1-chromium complexes or symmetrical or asymmetrical 1:2-cobalt complexes or 1:2-chromium complexes of, in particular, o-carboxy-o'-hydroxy-azo or o,o'-dihydroxy-azo dyestuffs of the benzene-azo-benzene, naphthalene-azo-naphthalene, benzo-azo-naphthalene, benzo-azo-pyrazole or benzo-azo-acetoacetamide type.

The dyestuffs can also contain fibre-reactive groups. Anionic optical brighteners, for example those of the stilbene series, can also be used.

The water-soluble cationic dyestuffs are those which possess a coloured cation and a colourless anion. Suitable cationic dyestuffs are those of the methine or azomethine series and also azo dyestuffs which contain an indolinium, pyrazolium, imidazolium, thiazolium, tetrazolium, oxdiazolium, thiadiazolium, oxazolium, diazolium, pyridinium, pyrimidinium or pyrazinium ring.

The heterocyclic compounds mentioned can optionally be substituted and fused with aromatic rings. Furthermore, cationic dyestuffs of the diarylmethane, triarylmethane, oxazine and thiazine series, and also azo and anthraquinone dyestuffs with external ammonium groups, can be used.

A large proportion of these dyestuffs are described in the Colour Index (3rd edition, published by The Society of Dyers and Colourists) under Acid Dyes, Direct Dyes, Basic Dyes, Mordant Dyes and Reactive Dyes.

The volatile salts employed are preferably ammonium salts and in particular those which still carry at least one H atom on the ammonium nitrogen atom. Salts which contain the $NH_4^\oplus$ ion are preferably used.

Examples which may be mentioned of ammonium compounds which can be employed according to the invention are: ammonium benzoate, ammonium oxalate, ammonium hydrogen sulphate, ammonium sulphate, ammonium chloride, ammonium bromide and ammonium fluosilicate.

Ammonium carbonate, ammonium bicarbonate and ammonium carbamate are preferably used.

According to the process of the invention, the water-soluble dyestuffs, after their preparation in an aqueous or predominantly aqueous medium, which can also contain water-soluble solvents, are salted out by adding the volatile salts, isolated by pressing off or filtering off by conventional processes and then dried at temperatures which are so high that the salt volatilises.

In a specific embodiment of the process the dyestuffs which have been salted out with non-volatile salts such as NaCl or $Na_2SO_4$, in the manner customary hitherto, are isolated and the dyestuff, which has a high salt content, is re-dissolved in water and again salted out by adding the volatile salts, isolated by pressing off or filtering off by conventional processes and then dried at temperatures which are so high that the salt volatilises.

Drying units which can be used are, for example, circulating air cabinets, continuous or discontinuous paddle driers, roller driers or belt driers. Drying can be carried out under normal pressure or under reduced pressure. The drying temperature is 40° C.–250° C., preferably 60° C.–150° C., under a pressure of about 10 mm Hg to about 760 mm Hg.

After the drying process, dyestuffs are obtained which are no longer contaminated by salts. The cationic dyestuffs preferably contain the anion of the volatile salt as the anion and the anionic dyestuffs preferably contain the cation of the volatile salt as the cation.

The salt-free dyestuffs are distinguished by good solubility in water and organic solvents.

They are suitable for the preparation of concentrated dyestuff solutions, for mass dyeing plastics and especially for spin-dyeing synthetic fibres such as, for example, polyamide fibres. Because of the freedom from salts, blocking of the spinning jets or effluorescence of the salts is avoided.

In aqueous or organic media, anionic dyestuffs, which according to this process contain an ammonium cation, can very easily be converted, by adding a stronger base, into the salt of the stronger base. Thus, for example, it is possible to prepare the Li salt from the ammonium salt of a dyestuff by adding LiOH, with volatilisation of $NH_3$.

EXAMPLE 1

100 g of a mixture consisting of 70% of the substantive yellow dyestuff of the formula

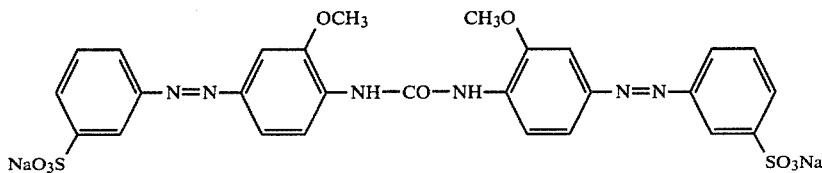

and 30% of sodium chloride, this being the form in which the dyestuff is obtained from the industrial synthesis, is dissolved at 50° C. in 1,400 ml of soft water. By introducing 225 g of ammonium carbonate in portions, the dyestuff is precipitated out. The dyestuff is filtered off and washed with a solution of 30 g of ammonium carbonate in 200 ml of soft water. The moist filter cake is dried at 100° C. 71 g of a yellow-brown powder which contains 98% of dyestuff and 2% of sodium chloride is obtained. The precipitation of the dyestuff with ammonium carbonate can also be effected directly from the reaction solution which is obtained from the synthesis of the dyestuff.

If 18 g of the dyestuff with a low salt content are dissolved in a mixture consisting of 39 ml of soft water, 15 g of diethylene glycol and 28 g of a reaction product of triethanolamine and ethylene oxide, the preparation of which is described, as amine 2, in DE-OS (German Published Specification) 2,341,293, and the solution is heated at 80° C. for 1 hour, whilst stirring, a dyestuff solution is obtained from which no dyestuff crystallises out on storing at 0° C.

EXAMPLE 2

100 g of a mixture consisting of 85% of the blue reactive dyestuff sodium 1-amino-4-[2'-methyl-3'-(2'',4''-difluoro-5''-chloro-6''-pyrimidinylamino)-phenylamino]-anthraquinone-2,5'-disulphonate and 15% of sodium chloride, this being the form in which the dyestuff is obtained from the industrial synthesis, are dissolved at 50° C. in 900 ml of soft water, whilst stirring. By introducing 125 g of solid ammonium bicarbonate in portions, the dyestuff is precipitated out. The dyestuff is filtered off and washed with a solution of 25 g of ammonium bicarbonate in 200 ml of soft water.

The moist filter cake is dried to constant weight at 80° C. 84 g of a blue-black powder which consists of 99.1% of dyestuff and 0.9% of sodium chloride is obtained. If the procedure described is repeated again, the sodium chloride content falls to below 0.1%. The precipitation of the dyestuff with ammonium bicarbonate can also be effected directly from the reaction solution which is obtained from the synthesis of the dyestuff.

20 g of the virtually salt-free dyestuff can be dissolved in 60 ml of water with the addition of 20 g of ε-caprolactam. No dyestuff crystallises out of this solution at 0° C.

Using the recipe given above, the dyestuff containing 15% of sodium chloride cannot be dissolved completely at room temperature.

EXAMPLE 3

100 g of a mixture consisting of 91% of the red chromium complex dyestuff of the formula

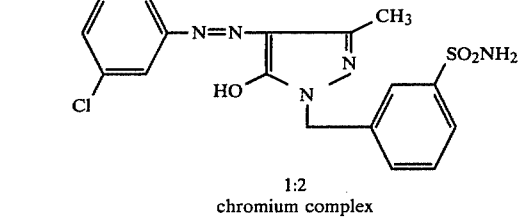

1:2 chromium complex and 9% of sodium chloride are dissolved at 50° C. in 2,500 ml of soft water. By introducing 250 g of ammonium carbonate in portions, the dyestuff is precipitated out virtually completely. The dyestuff is filtered off and dried at 100° C. 90 g of a red powder which consists of 99.2% of dyestuff and 0.8% of sodium chloride are obtained.

If the procedure described is repeated again, the sodium chloride content falls to below 0.1%. The dyestuff which has been reprecipitated twice with ammonium carbonate dissolves in dimethylformamide without leaving any residue. If a solution of 44.05 g of the dyestuff with a low salt content in 500 ml of soft water is heated with the addition of 2.1 g of lithium hydroxide. 1 $H_2O$ for 1 hour under reflux, ammonia escapes.

After evaporating the water, 46 g of a red powder which substantially consists of the lithium salt of the chromium complex dyestuff are obtained.

2% of this lithium salt of the dyestuff dissolve in molten ε-caprolactam without leaving any residue. An ε-caprolactam dyed in this way can be spun without problems.

EXAMPLE 4

100 g of a mixture consisting of 89% of the acid dye listed in the Colour Index as Acid Blue 83, No. 42,660 and 11% of sodium chloride, this being the form in which the dyestuff is obtained from the industrial synthesis, are stirred for two hours at 50° C. in 900 ml of soft water. The dyestuff has only partly dissolved. The pH value is adjusted to 6.5 by adding dilute acetic acid.

100 g of ammonium bicarbonate are then introduced in portions and after 30 minutes the dyestuff, which has precipitated out virtually completely, is filtered off and washed with a solution of 20 g of ammonium bicarbonate in 200 ml of soft water.

After drying at 100° C., 85 g of a blue-black powder which contains 98.5% of dyestuff and 1.5% of sodium chloride are obtained. If the procedure described is repeated, the sodium chloride content falls to below 0.2%.

Using the virtually salt-free dyestuff as the starting material, it is possible to prepare a stable solution consisting of 5 g of dyestuff, 30 g of diethylene glycol and 65 ml of water. When used in felt-tip pens, this solution does not lead to encrustation of the fibre tip by sodium chloride crystals.

We claim:

1. Process for the preparation of water-soluble dyestuffs with a low salt content, characterised in that the water-soluble dyestuffs are salted out from their aqueous solutions and/or dispersions by adding ammonium salts which are volatile at temperatures of about 40° C. to about 250° C. and under a pressure of about 10 mm Hg to about 760 mm Hg, the dyestuffs are isolated and the volatile salts are volatilised during the drying process.

2. Process according to claim 1, characterised in that the water-soluble dyestuffs are salted out by adding ammonium salts which are volatile at temperatures of about 60° C. to about 150° C. under a pressure of about 10 mm Hg to about 760 mm Hg.

3. Process according to claim 1 or 2, characterised in that volatile ammonium salts which still carry at least one H atom on the ammonium nitrogen atom are employed.

4. Process according to claim 1, characterised in that ammonium carbonate is employed.

5. Process according to claim 1, characterised in that ammonium carbamate is employed.

6. Process according to claim 1, characterised in that ammonium bicarbonate is employed.

7. Process according to any one of claims 5, 6 or 7, characterised in that anionic dyestuffs which contain a $NH_4^\oplus$ cation are converted, by adding stronger bases, into the salt of the stronger base, with volatilisation of $NH_3$.

* * * * *